Patented Apr. 29, 1924.

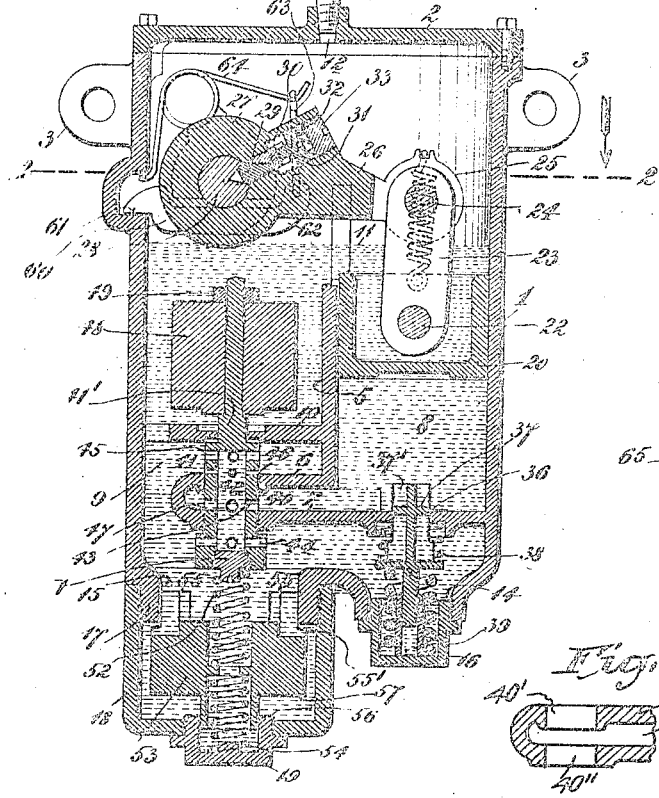

1,492,331

UNITED STATES PATENT OFFICE.

JAMES S. LANG, OF WATERTOWN, MASSACHUSETTS.

SHOCK ABSORBER.

Application filed September 12, 1922, Serial No. 587,681. Renewed September 22, 1923.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings in explaining its nature.

The present invention belongs to that class of shock absorbers which are especially adapted for motor vehicles, and in which the force required to pass a fluid through a restricted opening is utilized to prevent excessive vibration or rebound.

The object of the invention is to provide a generally improved shock absorber having extreme sensitiveness and silence in action.

The invention can best be seen and understood by reference to the drawings in which a shock absorber embodying the invention is shown, and in which—

Figure 1 is a medial vertical cross section.

Fig. 2 is a horizontal section on the line 2—2 of Fig. 1.

Fig. 3 is a section of a portion of the exterior casing and view of the interior shaft bearing.

Fig. 4 is a section of a portion of the exterior casing and view of the interior shaft bearing at right angles to that shown in Fig. 3.

Fig. 5 is a vertical section of a detail of construction to which reference will later be made.

Referring to the drawings:—

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also provided with various numbers or partitions 5, 6, 7, respectively, which provide within it a compression chamber 8, and outside this chamber immediately adjacent thereto a secondary or expansion chamber 9, with openings between the two chambers, certain of the partitions assisting in the valvular control of said openings. There is also provided a bridging member 10 acting as a support and stop for a valve later to be mentioned.

The casing forms a receptacle for oil contained within its respective chambers and maintained within the casing at about the level indicated at 11. Oil is introduced into the casing at the top by way of the inlet 12 closed by the filling plug 13. At the bottom the casing is provided with outlet openings 14 and 15. These openings provide outlets for the oil and also openings through which the parts above may be machined and through which certain of the working parts may be introduced into the casing. The opening 14 is closed by the plug or bonnet 16. Surrounding the opening 15 the casing 1 is extended to form an exteriorly threaded sleeve 17 upon which is threaded a cylindrical sub-casing 18 having its lower end closed by the plug or bonnet 19.

The compression chamber 8 is within a cylinder formed by the co-operation of the wall or partition 5 with the walls of the casing. Contained to reciprocate within the cylinder is a piston 20. The piston is provided with interior cheeks 21 within which a pin 22 is fixed to cross the space between the cheeks. Pivotally secured to the pin is a link 23 which is also pivotally secured to a pin 24 fixed in the spaced ends 25 of a rocker arm 26. The rocker arm 26 is provided with a hub 27 secured to a rock shaft 28 which turns within the spaced bearings 4 in the casing above referred to, the hub 27 occupying the space between the bearings. The hub 27 is fastened upon the shaft by means of the key 29 which is held tightly into its keyway by the pressure of the set screw 31 upon the tightening wedge 30. The set screw 31 is prevented from loosening by the lock washer 32 and slotted locking screw 33.

Either keyed upon the outer end of the shaft 28 or constructed integrally therewith is an external rocker arm 34 provided with a ball 35 for making a ball and socket connection with any suitable means (not shown) for connecting it to the axle of the vehicle.

With this arrangement of parts it will be seen that any change in the relative positions of the axle and vehicle frame or body due to inequalities in the roadway will act to move the piston 20, which is raised or lowered in the cylinder as the case may be.

Referring now to the means for controlling the passage of oil between the compression chamber 8 and the secondary or expansion chamber 9: The partition or wall 7 in the casing extends beneath the cylinder containing the compression chamber and forms the bottom wall of this chamber. Within the partition 7 at the lower end of the cylinder is located an opening 36 between the compression chamber and the secondary chamber which, as shown in Fig. 1, extends beneath the compression chamber. This opening is controlled by a valve having a circular disc 37 centralized with reference to the opening by suitable guiding fins 37'. The valve is controlled by springs 38, 39, the spring 38 being a light spring and the spring 39 much heavier. In its normal position the disc 37 fills the opening 36 as shown in Fig. 1. A slight excess of liquid pressure in chamber 9 over the pressure in chamber 8 will raise the disc 37 opening the passageway and compressing the light spring 38, and conversely a heavy pressure in the pressure chamber 8 will lower the disc 37 opening the passageway, allowing an escape of liquid from the chamber and compressing the heavy spring 39. The valve disc 37, therefore, permits of a relatively free flow of fluid from the secondary chamber into the cylinder when the piston is raised, but prevents the passage of fluid through the opening when the piston moves in a reverse direction except at a heavy pressure when such passage is permitted.

The partitions 6 and 7 co-operate with one another to form an extension passage 40 from the lower end of the compression chamber. The bridging support 10 and the partitions 6 and 7 are bored to provide an outlet from the compression chamber by way of openings 40', 40'' oppositely arranged and which receive with a sliding fit a cylindrical valve 41, the bore of partitions 6 and 7 around the opening 40', 40'' forming a valve seating. The valve 41 is provided with a hollow cylindrical space 42 forming a passageway for the transference of liquid from the compression space to the secondary chamber, and vice versa. Ports 43, 44, 45 and 46 are bored through the cylindrical walls of the valve. By means of these ports the passage of the fluid is controlled as the movement of the valve takes place. In order that the valve may be free from friction and in perfect balance the ports 43, 44, 45 and 46 are spaced equally around the circumference of the valve. The ports 46 are only provided in case it is desired that the movement of the valve be influenced by the piston through the flow of liquid in which case the combined area of ports 45 and 46 is greater than that of ports 44. In its normal position as shown in Fig. 1 there is free communication between the compression space 8 and the secondary chamber 9 by way of the wide open ports 43, the interior space 42 and the ports 44, 45 and 46. When the oil passes from the compression chamber 8 to the secondary chamber entering the valve through ports 43, its path is divided in the valve space 42, one portion passing out by way of ports 44 and the other passing out by way of ports 45 and 46. The edge 47 at the upper surface of partition 7 forms a working valve edge in connection with the ports 43, closing the latter when the valve is depressed and opening them when the valve is raised.

The valve is extended at its upper end to form a spindle 41' which is shouldered to receive a weight 48 fastened upon it by means of a lock nut 49 threaded thereon. In order to introduce the weight into the casing the latter is provided with an opening sufficiently large for the purpose, normally covered by a cover plate 50, after which the valve is inserted from below through opening 15. At the lower end of the valve the cavity 42 is closed by a taper plug 51, which is also adapted to receive the end of a supporting spring 52. The lower end of the spring 52 is retained in a suitable socket formed in the weighted support 53, thereby supporting the valve and its attached weight in its normal position as shown. The valve and its attached weight supported in a state of balance upon its supporting spring 52 is free to move in a vertical direction in response to such forces as may be brought to bear upon it. A stop to limit the upward movement of the valve after it has passed its full open position is provided by the valve coming into contact with the lower side of bridging support 10. A stop is also provided to limit the downward movement of the valve after it has passed its closed position, by the weight 48 coming into contact with the upper side of bridging support 10.

The weighted support 53 is also adapted to receive the upper end of a supporting spring 54 the lower end of which is retained by a suitable seating in the inside of closing plug 19, thereby supporting the weighted support 53 and the valve with its attached weight in the normal position as shown. The weighted support 53 carries at its upper end guiding fins 55 which slide within the bore of the sleeve 17, and is extended at its lower end to form a sleeve 56 slidably fitting the interior bore of cap 19. The weighted support 53 being thus held in alignment by the fins 55 and the sleeve 56 and supported by the spring 54 in a state of balance, is free to move in a vertical direction in response to such forms as may be brought to bear upon it. A stop to limit the upward movement of the weighted support 53 is formed by a shoulder 55' on the fins 55 coming in contact with the lower end of sleeve 17, and a stop to limit the downward movement of support 53 is provided by a lower surface 57 of the weighted support 53 coming into contact with the upper end of the plug 19.

The valve 41 and its attached weight 48 may be considered as one with reference to the effects of their inertia, and as before stated is open in its normal upper position and closed when depressed. The valve is operated in part if the ports are as shown, or fully if ports 46 are dispensed with, by the inertia of the valve itself with attached weight 48 and the inertia of the weighted support 53.

The valve 41 and attached weight 48 in normal position are supported by the spring 52 in static balance as shown in Fig. 1 or if desired resting against its upper stop. If depressed from this position and state the spring 52 will be compressed, depressing in turn to a less degree the weighted support 53 and compressing the spring 54, and upon release will return to its original position as inertias of the weighted valve and weighted support are overcome by their respective springs. If now the absorber casing 1 carrying the bridge 10, valve seating 47 together with the spring-supporting cap 19 be suddenly raised, the inertia of the weighted support 53, due to its considerable mass, will tend to cause it to lag behind the rise of the casing, compressing the spring 54 and resulting in a relative movement between the casing and the weighted support. The weighted support 53 although delayed by its inertia, is returned to its normal position in the casing as the spring 54 overcomes its inertia and the increased tension of spring 52, therefore being finally raised in actual elevation. The actual rise of the weighted support 53 lagging behind that of the casing, compresses the spring 52, while the valve and its attached weight 48, on account of its own inertia, lags in its rise behind the rise of the weighted support 53, resulting in an immediate and pronounced relative movement between the valve and casing. This relative movement closes ports 43. If the upward movement of the casing is not continued the compressed springs 52 and 54 will in turn overcome the inertias of the weighted valve and weighted support and the ports will regain their original positions in the casing, reopening the ports 43.

The function of the weighted support 53 and the supporting spring 54 is therefore to accentuate and prolong the lag of the valve and its attached weight 48 as compared with the lag which would have taken place had the spring 52 been supported at its lower end from the casing directly.

The operation of the absorber is as follows: It will be assumed that all the parts of the shock absorber are in a normal position with the ports 43 open, the piston occupying a position about midway of the cylinder, and that the vehicle with its axle in normal relation to the body encounters a raised obstruction in the roadway having an abrupt rise succeeded by a corresponding decline and of sufficient height and width under ordinary circumstances to produce a violent rebound. As the wheels mount the rise the axle is brought nearer to the body of the vehicle, compressing the vehicle springs. Simultaneously with the rise of the axle the hub 27 is turned lifting the rocker arm 26, which raises the piston in the cylinder, and oil is drawn into the compression chamber below the piston from the secondary chamber by way of valve 37 opening easily in the upward direction. If, as assumed above, the approach is quite abrupt followed by an immediate decline, the inertia of the vehicle body will prevent its appreciable rise until the wheels reach the top of the obstruction when an incipient rebound will begin. The vehicle body then rises slightly from its line of travel and simultaneously the axle begins to move away from the body as the wheels pass the horizontal crown, moving the piston downward in the cylinder and discharging oil through the ports 43.

As before explained, the slight rise in the vehicle body in passing the obstruction in conjunction with the inertias of the weighted support 53 and the weight 48, together with any other forces which may be acting, cause the ports 43 to instantly and completely close. The ports 43 being closed, the liquid can only escape from the cylinder under the heavy pressure required to depress the disc 37 below the opening 36, thus opposing the descent of the piston in the cylinder and preventing a violent rebound. As the wheels descend the further side of the obstruction the weighted support 53 and the weighted valve regain their normal position, reopening the ports 43 and allowing the vehicle springs to resume their unhampered normal state of compression.

In order to prevent the rock shaft 28 from rattling within the bearings 4 when worn it is kept in constant firm contact with the upper inner surface of the bearing at 58 by means of the pressure exerted by upwardly-pressing bearings 59. These bearings are formed on the upper sides of arms 60 one end of each of which rests upon a seating 61 located on the inner wall of the casing 1, while the other ends are each provided with an eye 62 adapted to receive a connecting link 63 by which the arms are drawn up into firm contact with the lower side of the shaft, the under sides of the bearings 4 being slotted to receive the arms and admitting of the bearings 59 engaging the shaft. The link 63 is maintained under strong tension by means of the double spring 64 the end of which it engages. The spring 64 serves both arms, its middle section 65 resting against the inner wall of the casing, while a section of the coil 64 is fulcrumed in a curved socket 66 formed on the upper surface of the bearing 4 as shown. With this arrangement the upward pressure exerted by the arms upon the under side of the shaft, owing to the leverage exerted by the arms, is considerably greater than the force exerted by the spring.

Having thus fully described my invention, I claim and desire to secure by Letters Patent of the United States:—

1. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, a weighted valve for controlling said outlet, a weighted support, means for yieldingly supporting the valve from said weighted support, and means for yieldingly supporting said weighted support.

2. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, a weighted valve for controlling said outlet, a weighted support, means for yieldingly supporting the valve from said weighted support, and means for yieldingly supporting the weighted support from said chambered element.

3. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, a weighted valve for controlling said outlet, and means for yieldingly supporting said valve to operate normally in a substantially balanced open position with relation to the outlet, said means comprising a weighted support, an elastic element between the support and the valve and an elastic element between the weighted support and said chambered element.

4. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, valvular mechanism for controlling said outlet, a flexible mechanism connecting said piston with the other of said parts and having a rock shaft, said chambered element being provided with bearings for said shaft, a lever fulcrumed upon said chambered element and arranged to bear against said shaft for raising and holding it against the upper side of its bearings, and a spring retaining said lever.

5. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, valvular mechanism for controlling said outlet, a flexible mechanism connecting said piston with the other of said parts and having a rock shaft, said chambered element being provided with bearings for said shaft, a lever supported in part from said chambered element and having a bearing surface engaging said shaft from the under side thereof for raising and holding it against its bearings, and a spring exerting tensional strain upon said lever.

6. A fluid check shock absorber for controlling the movement of relatively movable parts comprising a chambered element attachable to one of said parts and having within it a pressure chamber, said element being provided also with means permitting of the circulation of a fluid into and out of said chamber and consisting in part of a controllable outlet, a piston attachable to the other of said parts and reciprocable in said pressure chamber, valvular mechanism for controlling said outlet, a flexible mechanism connecting said piston with the other of said parts and having a rock shaft, said chambered element being provided with bearings for said shaft, a set of levers fulcrumed on said chambered element and carrying boxes presenting bearing surfaces in engagement with the under side of said shaft, and an elastic means for retaining said levers whereby said shaft will be lifted and held in engagement against the upper sides of its bearings.

7. In a fluid check shock absorber for controlling the movement of relatively movable parts, the combination comprising an element attachable to one of said parts and having a fluid-containing pressure chamber and outside the same a secondary chamber with an outlet from said pressure chamber into said secondary chamber and also a port between said chambers, a piston attachable to the other of said parts and reciprocable in said pressure chamber, a valvular mechanism controlling said outlet to throttle the passage of fluid therethrough in a manner whereby the movement of the piston in one direction will be impeded, a valvular mechanism controlling said port to permit of the free entry of fluid from the secondary chamber into the pressure chamber when the piston moves in one direction and to permit of the passage of fluid through said port out of the pressure chamber upon a reverse movement of the piston only when the fluid has become compressed therein by the piston in a determinate amount.

8. In a fluid check shock absorber for controlling the movement of relatively movable parts, the combination comprising an element attachable to one of said parts and having a fluid-containing pressure chamber and outside the same a secondary chamber with an outlet from said pressure chamber into said secondary chamber and also a port between said chambers, a piston attachable to the other of said parts and reciprocable in said pressure chamber, a valve controlling said outlet, means for supporting said valve whereby it may throttle the passage of fluid therethrough out of the pressure chamber in a manner whereby the movement of the piston in one direction will be impeded, a valve controlling said port, and means for supporting and arranging said last-named valve to close said port or pass therethrough and open in reverse directions permitting of a free passage of fluid into said pressure chamber as the piston moves in one direction and of the passage of fluid out of said pressure chamber upon a reverse movement of the piston only when the fluid has become compressed therein by the piston in a determinate amount.

JAMES S. LANG.